(12) United States Patent
Tanaka

(10) Patent No.: US 7,269,298 B2
(45) Date of Patent: Sep. 11, 2007

(54) IMAGE PROCESSING DEVICE, IMAGE PROCESSING METHOD, AND RECORD MEDIUM ON WHICH THE SAME IS RECORDED

(75) Inventor: Hideaki Tanaka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 918 days.

(21) Appl. No.: 10/343,437

(22) PCT Filed: Aug. 27, 2001

(86) PCT No.: PCT/JP01/07339

§ 371 (c)(1),
(2), (4) Date: Jan. 31, 2003

(87) PCT Pub. No.: WO02/23482

PCT Pub. Date: Mar. 21, 2002

(65) Prior Publication Data

US 2004/0101209 A1    May 27, 2004

(30) Foreign Application Priority Data

Sep. 14, 2000   (JP)   ............................ 2000-280320

(51) Int. Cl.
*G06K 9/36*   (2006.01)
*G06K 9/32*   (2006.01)

(52) U.S. Cl. .................... 382/289; 382/176; 382/199

(58) Field of Classification Search .............. 382/199, 382/197, 173, 176, 177, 286, 289, 290, 293, 382/295, 296, 254
See application file for complete search history.

(56) References Cited

U.S. PATENT DOCUMENTS

| 5,448,692 | A |   | 9/1995  | Ohta |   |
|---|---|---|---|---|---|
| 5,594,817 | A | * | 1/1997  | Fast et al. | 382/290 |
| 5,841,905 | A | * | 11/1998 | Lee | 382/203 |
| 5,974,199 | A | * | 10/1999 | Lee et al. | 382/289 |
| 7,006,708 | B1 | * | 2/2006  | Nako et al. | 382/294 |

FOREIGN PATENT DOCUMENTS

| JP | 62-198971 A | 9/1987 |
|---|---|---|
| JP | 64-64076 A | 3/1989 |
| JP | 2-59978 A | 2/1990 |
| JP | 2-103683 A | 4/1990 |
| JP | 3-154979 A | 7/1991 |
| JP | 5-14703 A | 1/1993 |
| JP | 7-311867 A | 11/1995 |
| JP | 8-201021 A | 8/1996 |
| JP | 8-251387 A | 9/1996 |
| JP | 9-120430 A | 5/1997 |
| JP | 10-11584 A | 1/1998 |
| TW | 197509 B | 1/1993 |
| TW | 283224 B | 8/1996 |
| TW | 308677 B | 6/1997 |

* cited by examiner

*Primary Examiner*—Yon Couso
(74) *Attorney, Agent, or Firm*—Birch, Stewart, Kolasch & Birch, LLP

(57) ABSTRACT

The image processing apparatus extracts edge pixels of an input image, connects the edge pixels so as to extract a segment, extracts an inclination angle of the image based on the segment, corrects an inclination of the image based on the angle, determines that correction has ended when the corrected inclination is equal to or less than a predetermined threshold value, and repeats inclination extraction, inclination correction and end determination using an output image obtained after the inclination correction as a new input image until it is determined that correction has ended.

11 Claims, 9 Drawing Sheets

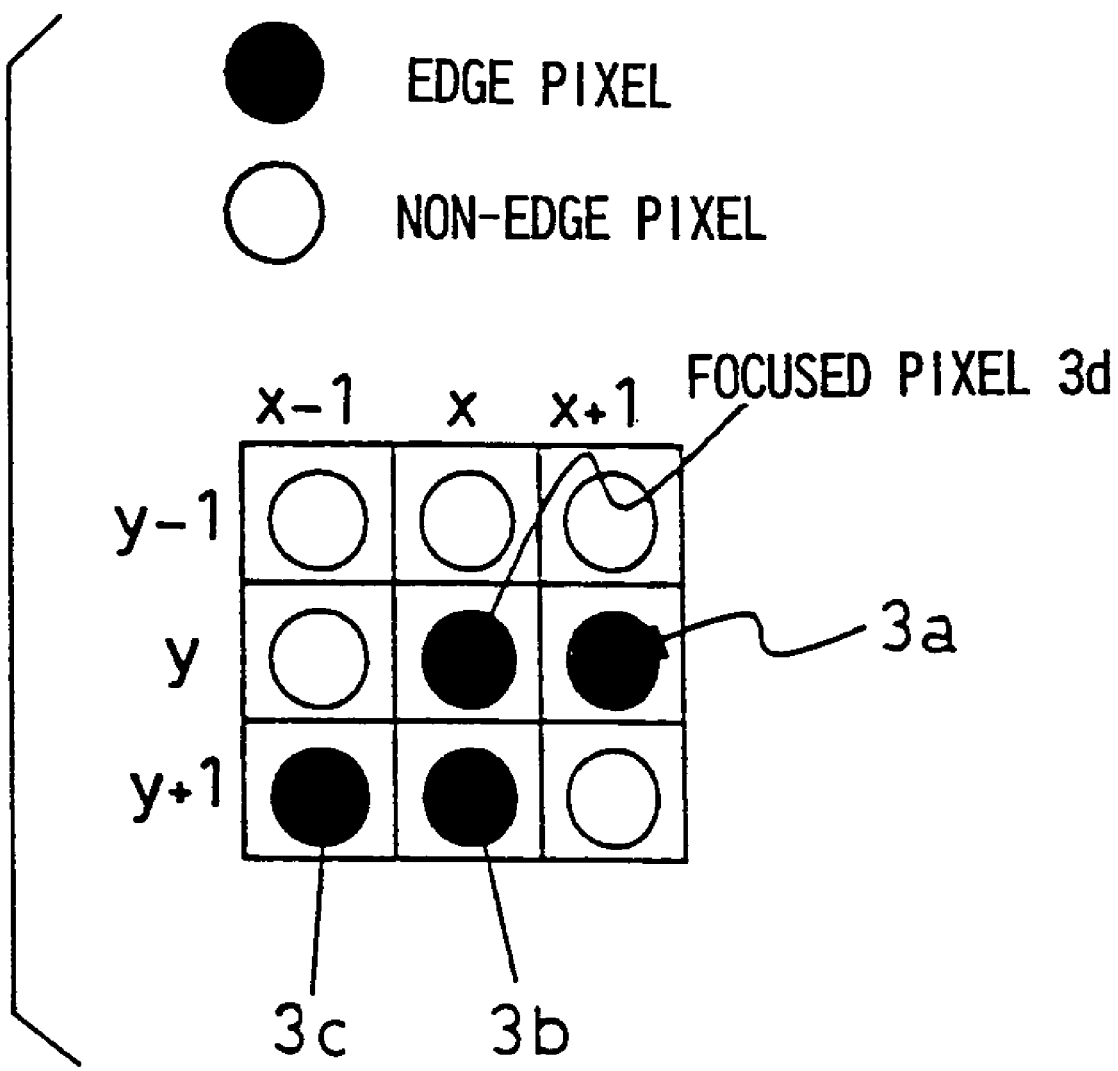

IMAGE PROCESSING DEVICE, IMAGE PROCESSING METHOD, AND RECORD MEDIUM ON WHICH THE SAME IS RECORDED

This application is the national phase under 35 U.S.C. § 371 of PCT International Application No. PCT/JP01/07339 which has an International filing date of Aug. 27, 2001, which designated the United States of America.

TECHNICAL FIELD

The present invention relates to an image processing apparatus for correcting an inclination of input image data, an image processing method and a record medium on which the same is recorded.

BACKGROUND ART

The center of the industry was shifted from the hardware industry to the software industry in the process of its development in the past, and it is predicted that it will be shifted to the contents industry in the twenty-first century. The closest target of the contents industry is electronic books that have attracted attention in Japan and worldwide in recent years. Among these, an electronic book based on images that can be created at a low cost by applying an image processing technique is considered to be promising. Especially in Japan, "comic books" that account for a half of all the books made of paper in terms of sales are objects thereof, so that the image-based electronic books will be the center thereof.

The image-based electronic books have the advantages that most of the creation processes from (1) scanner input, (2) inclination correction, (3) various kinds of image processing, (4) manual modification/editing to (5) contents output can be automated based on the existing proof-read books, and the contents can be created at a very low cost. Then, the contents data that will be commercial products have to be subjected to inclination correction with high precision, so that the process (2) of inclination correction is particularly important in the creation processes.

The "inclination correction technique" for correcting an inclination of an input image automatically already has been realized by an electronic filing system, a pre-processing function of OCR (Optical Character Reader) software or the like, and conventional techniques are disclosed in an "image processing apparatus" of Japanese Unexamined Patent Publication JP-A 9-120430 (conventional technique 1) and an "image filing apparatus" of Japanese Unexamined Patent Publication JP-A 1-64076 (conventional technique 2).

The conventional technique 1 is a method in which when ruled lines or the like are present in an image, coordinate strings for the outline of an image are scanned so as to obtain the four corners of the outline, a slender shaped object is extracted as a segment from the four corners, and an inclination of the image is extracted from the most slender shaped segment of the extracted segments and is corrected.

The conventional technique 2 is a method in which under the precondition that a peripheral edge portion of an input original is white, an area outside the original at the time of image input is black, and the peripheral edge portion of the original is extracted based on that information, and thus an inclination of the original is extracted based on that edge information and is corrected.

In the conventional technique 1, when an isolated segment is present, stable properties can be obtained. In the conventional technique 2, when the peripheral edge of the original is white, stable performance can be obtained.

However, when these conventional techniques are applied to "comic books", which are the most important in the image-based electronic books, then various problems of the "comic books" decrease correction precision. As a result, the number of manual processes for correction is increased, so that the advantage (low cost conversion to electronic books) of image-based electronic books is compromised. The problems of the conventional techniques will be described more specifically below.

In the conventional technique 1, an object whose outline shape is slender is extracted as a segment, and therefore when a segment is in contact with a character or a picture (such a case is frequently present in the comic books), the four corners of the outline of a segment cannot be obtained, and the outline shape is not slender, so that this technique cannot be applied.

Furthermore, since only the most slender segment is used, a correction result can be an error when the segment inclines. This is because a frame line may be drawn obliquely on purpose in the comic books.

In the conventional technique 2, it is the precondition that the peripheral edge of an original is white, and a portion outside the original at the time of image input is constituted by black pixels, so that the peripheral edge can be extracted. However, for an original in which there is a picture in the periphery or an original whose periphery is entirely black (these cases also occurs frequently in comic books), the peripheral edge of the original cannot be extracted precisely, and a correction result may be an error.

As described above, when comic books are subjected to these techniques, these techniques cannot perform inclination correction with high precision.

It is an object of the invention to provide an image processing apparatus that can perform inclination correction with high precision even if a segment present in an image is in contact with a character or a picture, an oblique segment which is a factor of a correction error is present, or the peripheral edge of an original is not white, an image processing method and a record medium on which the same is recorded.

DISCLOSURE OF INVENTION

The invention provides an image processing apparatus for correcting an inclination of an input image, including:

edge extracting means for extracting edge pixels of an input image;

segment extracting means for extracting a segment by connecting the edge pixels extracted by the edge extracting means;

inclination extracting means for extracting an inclination angle of the image based on the segment extracted by the segment extracting means; and inclination correcting means for correcting an inclination of the image based on the inclination angle of the image extracted by the inclination extracting means.

According to the invention, the image processing apparatus extracts edge pixels of an input image, connects the extracted edge pixels so as to extract a segment, extracts an inclination angle of the image based on the extracted segment, and corrects an inclination of the image based on the extracted inclination angle of the image. Therefore, even if a segment present in the input image is in contact with a character or a picture, even if an oblique, which is a factor of a correction error, is present, or even if the peripheral edge of the original is not white, inclination correction can be performed with high precision.

The invention is characterized in that the edge extracting means sets pixel values in a central area of the input image to one and the same predetermined pixel value as pre-processing for extracting edge pixels.

According to the invention, since the edge extracting means sets pixel values in an central area of the input image to one and the same predetermined pixel value as pre-processing for extracting edge pixels, error factors present in the central area of the image such as oblique segments are eliminated, so that the inclination correction performance can be improved and inclination correction can be performed in a high speed.

The invention is characterized in that the segment extracting means includes:

means for connecting edge pixels so as to extract edge coordinates;

means for scanning the edge coordinates so as to assign a code for a direction from each edge coordinate to the next edge coordinate; and means for scanning the direction code of each edge coordinate, erasing an edge coordinate of a point whose direction code has a difference of not more than a predetermined threshold value in the inclination from an adjacent direction code thereof, storing an edge coordinate of an inflection point that has a difference larger than a predetermined threshold value in the inclination and storing an edge coordinate of the end point, extracting a new segment by connecting each point, and assigning a new direction code to the new segment.

According to the invention, the segment extracting means connects edge pixels so as to extract edge coordinates, scans the edge coordinates so as to assign a code for a direction from each edge coordinate to the next edge coordinate, scans the direction code of each edge coordinate, erases an edge coordinate of a point whose direction code has a difference of not more than a predetermined threshold value in the inclination from an adjacent direction code thereof, stores an edge coordinate of an inflection point that has a difference larger than a predetermined threshold value in the inclination and stores an edge coordinate of the end point, further extracts a new segment by connecting each point, and assigns a new direction code to the new segment. Thus, each segment can be extracted from the edge coordinates.

The invention is characterized in that the segment extracting means scans the segments to which the new direction code is assigned, and extracts a segment whose segment length is longer than a predetermined threshold value and whose inclination in the direction code is in a predetermined range as a horizontal segment or a vertical segment.

According to the invention, the segment extracting means scans the segments to which the new direction code is assigned, and extracts a segment whose segment length is longer than a predetermined threshold value and whose inclination in the direction code is in a predetermined range as a horizontal segment or a vertical segment. Therefore, extremely oblique segments or short segments that are unwanted for inclination correction can be removed.

The invention is characterized in that the inclination extracting means extracts an angle of each segment with respect to all the extracted segments, multiplies the extracted angle of each segment by a weight obtained by taking the sum of the length of all the segments as a denominator and the length of each segment as a numerator, and extracts a value obtained by adding all the segment angles with the weight as an inclination angle of the image.

According to the invention, the inclination extracting means extracts each segment angle with respect to all the extracted segments, multiplies the extracted angle of each segment by a weight obtained by taking the sum of the length of all the segments as a denominator and the length of each segment as a numerator, and extracts a value obtained by adding all the segment angles with the weight as an inclination angle of the image. Therefore, the longer the segment is, the more likely it is that the inclination angle thereof is used, and the hardly the angle of a segment that can be an error factor is reflected.

In another aspect, the invention provides an image processing apparatus for correcting an inclination of an input image including:

inclination extracting means for extracting an inclination with respect to an input image;

inclination correcting means for correcting an inclination of the image based on the inclination extracted by the inclination extracting means; and end determining means for determining that correction has ended when the inclination corrected by the inclination correcting means is equal to or less than a predetermined threshold value, wherein inclination extraction, inclination correction and end determination are repeated using an output image obtained after the inclination correction as a new input image until the end determining means determines that correction has ended.

According to the invention, an image processing apparatus extracts an inclination with respect to an input image, corrects an inclination of the image based on the extracted inclination, determines that correction has ended when the corrected inclination is not more than a predetermined threshold value. When the inclination is larger than a predetermined threshold value, the apparatus repeats inclination extraction, inclination correction and end determination using an output image obtained after the inclination correction as a new input image, until it is determined that correction has ended. Thus, the precision of inclination correction can be improved.

In another aspect, the invention provides an image processing method for correcting an inclination of an input image including:

extracting edge pixels of an input image;

connecting the extracted edge pixels so as to extract a segment;

extracting an inclination angle of the image based on the extracted segment; and correcting an inclination of the image based on the extracted inclination angle of the image.

According to the image processing method of the invention, edge pixels of an input image are extracted, the extracted edge pixels are connected so as to extract a segment, an inclination angle of the image is extracted based on the extracted segment, and an inclination of the image is corrected based on the extracted inclination angle of the image. Therefore, even if a segment present in the input image is in contact with a character or a picture, even if an oblique, which is a factor of a correction error, is present, or even if the peripheral edge of the original is not white, inclination correction can be performed with high precision.

In another aspect, the invention provides an image processing method for correcting an inclination of an input image including the steps of:

extracting an inclination with respect to an input image;

correcting an inclination of the image based on the extracted inclination; and determining that correction has ended when the corrected inclination is equal to or less than a predetermined threshold value, wherein when the corrected inclination is larger than a predetermined threshold value, inclination extraction, inclination correction and end determination are repeated using an output image obtained after the inclination correction as a new input image, until it is determined that correction has ended.

According to the image processing method of the invention, an inclination is extracted with respect to an input image, an inclination of the image is corrected based on the extracted inclination, it is determined that correction has ended when the corrected inclination is equal to or less than a predetermined threshold value, and when the inclination is larger than a predetermined threshold value, inclination extraction, inclination correction and end determination are repeated using an output image obtained after the inclination correction as a new input image, until it is determined that correction has ended. Thus, the precision of inclination correction can be improved.

In another aspect, the invention provides a computer-readable record medium storing a program for letting a computer execute an image processing method including the steps of:

extracting edge pixels of an input image;

connecting the extracted edge pixels so as to extract a segment;

extracting an inclination angle of the image based on the extracted segment; and correcting an inclination of the image based on the extracted inclination angle of the image.

According to the invention, the computer-readable record medium storing a program to be executed by a computer stores an image processing method including extracting edge pixels of an input image, connecting the extracted edge pixels so as to extract a segment, extracting an inclination angle of the image based on the extracted segment, and correcting an inclination of the image based on the extracted inclination angle of the image. Therefore, even if a segment present in the input image is in contact with a character or a picture, even if an oblique, which is a factor of a correction error, is present, or even if the peripheral edge of the original is not white, inclination correction can be performed with high precision.

In another aspect, the invention provides a computer-readable record medium storing a program for letting a computer execute an image processing method including the steps of:

extracting an inclination with respect to an input image;

correcting an inclination of the image based on the extracted inclination, and determining that correction has ended when the corrected inclination is equal to or less than a predetermined threshold value, wherein when the corrected inclination is larger than a predetermined threshold value, inclination extraction, inclination correction and end determination are repeated using an output image obtained after the inclination correction as a new input image, until it is determined that correction has ended.

According to the invention, the computer-readable record medium storing a program to be executed by a computer stores an image processing method including extracting an inclination with respect to an input image, correcting an inclination of the image based on the extracted inclination, determining that correction has ended when the corrected inclination is equal to or less than a predetermined threshold value, and repeating inclination extraction, inclination correction and end determination using an output image obtained after the inclination correction as a new input image until it is determined that correction has ended, when the inclination is larger than a predetermined threshold value. Thus, inclination correction can be performed with high precision.

BRIEF DESCRIPTION OF DRAWINGS

Other and further objects, features, and advantages of the invention will be more explicit from the following detailed description taken with reference to the drawings wherein:

FIG. 3 is a schematic diagram for explaining eight connections of edge pixels;

BEST MODE FOR CARRYING OUT THE INVENTION

Hereinafter, embodiments of the present invention will be described by taking a general comic image as an example.

Figure 1:
FIG. 1 is a schematic drawing showing a comic image 1 that has been input with a portion outside an original being black.

FIG. 1 is a schematic drawing showing a comic image 1 that has been input with a portion outside an original being black. As shown in FIG. 1, the comic image 1 includes a cut-off portion (portion in which the drawing is present up to the edge of the original) 1a, a portion 1b of the peripheral edge of the original that is colored black, and a frame line 1c that is drawn obliquely on purpose. However, most frame lines drawn in the vicinity of the periphery of the original, extend in the horizontal direction that is parallel to the upper side and the lower side of the original, such as a frame line 1d, or in the vertical direction that is parallel to the left side and the right side of the original, and few oblique frame lines are drawn beyond the portion in which drawings are present. In other words, most of the frame lines drawn in the vicinity of the periphery of the original are lines extending in the horizontal direction or the vertical direction. Some frame lines are present isolated, but many of the frame lines, such as a frame line 1e, are in contact with a picture or a screen tone. There is a side on which the entire peripheral edge of the original is white, such as a side 1f.

Next, an image processing method with an image processing apparatus that is an embodiment of the present invention will be described. The image processing apparatus includes edge extracting means for extracting edge pixels of an input image, segment extracting means for connecting the extracted edge pixels so as to extract a segment, inclination extracting means for extracting an inclination angle of the image based on the extracted segment, inclination correcting means for correcting an inclination of the image based on the extracted inclination angle of the image, and end determining means for performing end determination based on the extracted inclination. The image processing apparatus performs image processing in which an inclination of an original with respect to an input image such as the comic image 1 shown in FIG. 1 is corrected, that is, correction is performed such that the peripheral edge of the original is parallel to the vertical frame and the horizontal frame of the input image.

When the comic image 1 shown in FIG. 1 is input, the image processing apparatus focuses on segments in the horizontal direction and the vertical direction in a peripheral area of a dominant image, and therefore, first, the central area of the input comic image 1 is masked with background pixels that are for a portion outside the frame of the original, that is, white pixels in this embodiment. In other words, the pixel values in the central area are set to one and the same predetermined pixel value. The shape of the central area to be masked can be arbitrary, such as a circle or a rectangle. In this embodiment, the shape of the central area is a rectangle, and the length in the longitudinal direction is ⅓ of that of the input image, and the length in the width direction is ⅓ of the input image. Since error factors (e.g., oblique segments) present in the central portion of the image are eliminated by masking the central area in this manner, the performance of inclination correction can be improved and inclination correction can be performed in a high speed. It should be noted that the same results can be obtained when image processing is performed in the manner that will be described below with respect to all pixels, and the portion near the center is ignored at the final stage, but in this case, the processing speed can be reduced because processing with respect to unnecessary pixels is required.

Then, the edge pixels of the masked image are extracted by the edge extracting means. This is performed by scanning the image in the two directions, that is, from up to down and from left to right, and extracting a focused pixel as an edge pixel, when the focused pixel is a black pixel and the immediately previous pixel value is a white pixel or the immediately following pixel value is a white pixel.

Figure 2:
FIG. 2 is a schematic drawing showing an extracted image 2 in which edge pixels are extracted from the comic image 1 shown in FIG. 1.

FIG. 2 is a schematic drawing showing an extracted image 2 in which edge pixels are extracted from the comic image 1 shown in FIG. 1. When a human looks at the extracted image 2 shown in FIG. 2, he/she has the false impression that segments are extracted from the comic image 1. However, in reality, simply the extracted edge pixels are displayed black and other non-extracted pixels are displayed white, and information on segments or the like cannot be obtained.

Referring to the extracted image 2, in a portion 2a corresponding to the cut-off portion 1a shown in FIG. 1 and a portion 2b corresponding to the portion 1b shown in FIG. 1 in which the peripheral edge of the original is colored black, there is no difference from a portion outside the original that is input so as to be black, and the edge of the original is unstable. In the masked area 2c, which is the central area in FIG. 2, oblique segments are significantly eliminated by masking, and this area is displayed as a white rectangle. Furthermore, when the portion outside the original is input with black pixels as shown in FIG. 1, the side 2f corresponding to the side 1f in FIG. 1 whose periphery is constituted by distinct white pixels is the longest edge segment.

Then, an edge coordinate string is created by connecting edge pixels by the segment extracting means. FIG. 3 is a schematic diagram for explaining connection of eight edge pixels. As shown in FIG. 3, the connection of edge pixels is performed in the following manner, for example. A unconnected edge pixel 3d having a two-dimensional coordinate (x, y) is taken as a focused pixel, an unconnected edge pixel 3a having a coordinate (x+1, y) that is the first pixel of the eight neighboring pixels when viewed in a predetermined direction, that is, clockwise in this embodiment, is connected to the focused pixel. Thereafter, the connected edge pixel 3a is taken as a new focused pixel, and the same processing is repeated until unconnected pixels are no longer present in the eight neighboring pixels.

Thus, the edge pixels are converted to an edge coordinate string (Xi, Yi) of a string. As for the edge coordinate strings, for example, in the case of one character, one coordinate string is created with the outermost contour (or innermost contour) thereof.

Figures 4A, 4B:
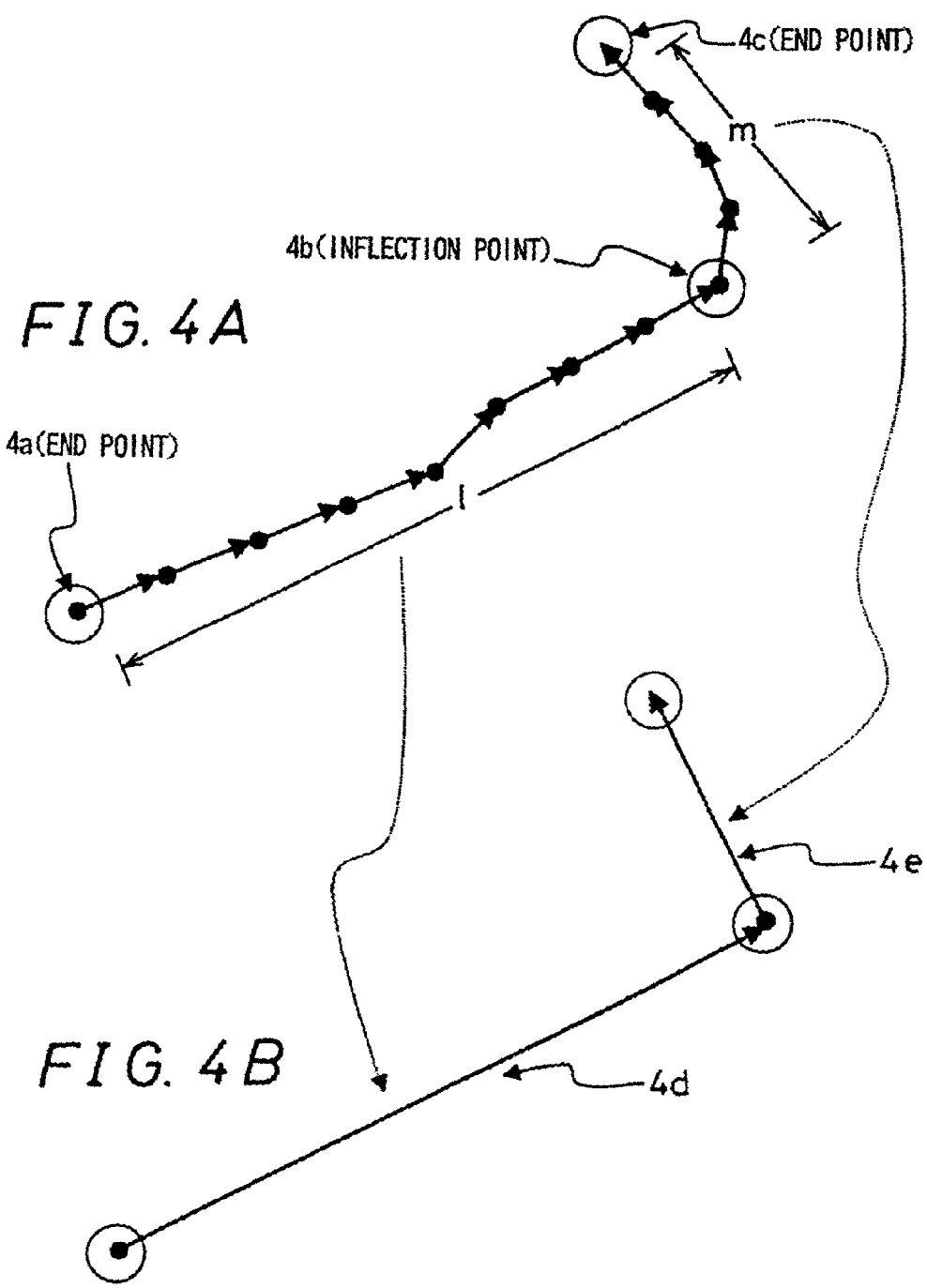
FIGS. 4A and 4B is a schematic diagram for explaining assignment of direction codes.

Then, a direction code is assigned to the edge coordinate string by the segment extracting means. FIG. 4 is a schematic diagram for explaining assignment of direction codes. In FIG. 4, one coordinate of a coordinate string is shown by an arrow starting with a black circle, and the arrow indicates its direction. Here, first, as shown in FIG. 4A, the coordinate string is scanned and a direction code is assigned with respect to the direction from the focused coordinate to the next coordinate. The direction code of this embodiment is a vector code obtained by quantizing the direction with 64 codes in a counterclockwise rotation of 360 degrees. Direction code 1 and direction code 33 are direction codes for the horizontal direction. Direction code 17 and direction code 49 are direction codes for the vertical direction.

Furthermore, as shown in FIG. 4B, each edge coordinate and the direction code thereof are scanned, the edge coordinate of a point whose direction code has a difference of not more than a predetermined threshold value in the inclination from an adjacent direction code thereof is erased, and the edge coordinate of a point (inflection point 4b) that has a difference larger than a predetermined threshold value in the inclination and the edge coordinates of the end points 4a and 4c are stored.

Figure 5:
FIG. 5 is a schematic drawing showing a segment extracted image 5 that is drawn by new segments extracted from the extracted image 2 shown in FIG. 2.

A new segment 4d connecting a section 1 between the end point 4a and the inflection point 4d and a new segment 4e connecting a section m between the end point 4c and the inflection point 4d are extracted based on the stored edge coordinates. For the extracted segments 4d and 4e, a new direction code is recalculated based on the coordinates of both the ends thereof, and a new direction code is assigned. FIG. 5 is a schematic drawing showing a segment extracted image 5 that is drawn with new segments extracted from the extracted image 2 shown in FIG. 2.

Figure 6:
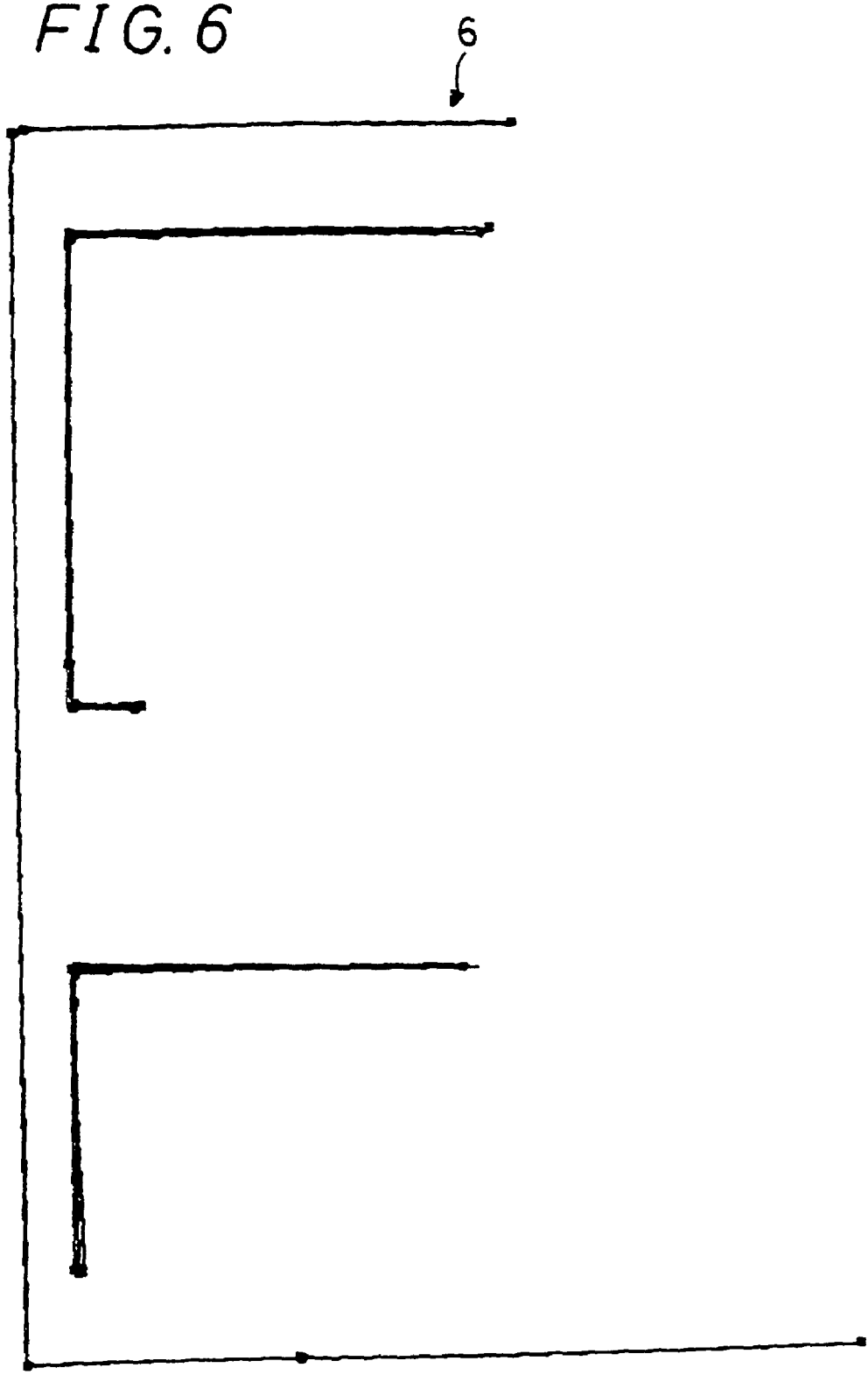
FIG. 6 is a schematic drawing showing a segment extracted image 6 in which horizontal segments and vertical segments are extracted from the segment extracted image 5 shown in FIG. 5.

Then, the segment extracting means erases all the segments except segments having the direction code 1 and the direction code 33 indicating the horizontal direction and segment having the direction code 17 and the direction code 49 indicating the vertical direction, and erases segments having a segment length of not more than a predetermined threshold value from all the extracted segments. In other words, horizontal segments and vertical segments having a length larger than a predetermined threshold value are kept present. More specifically, this is processing by which segments that are substantially horizontal or vertical with a difference in the range of ±5.6 degrees are kept present, because one direction code has a range of 360/64=5.6 degrees. Thus, extremely oblique segments are deleted. FIG. 6 is a schematic drawing showing a segment extracted image 6 in which horizontal segments and vertical segments are extracted from the segment extracted image 5 shown in FIG. 5.

Then, the inclination extracting means extracts an inclination angle and a segment length of each segment, and calculates an inclination angle of the image. The calculation of an inclination angle is performed by the inclination extracting means in the following manner. With respect to all the extracted segments, the angle of each segment extracted from the direction code is multiplied by a weight obtained by taking the sum of the length of all the extracted segments as a denominator and the length of each segment as a numerator, and a value obtained by adding all the segment angles with the weight is extracted as an inclination angle of the image. In this method for extracting an inclination angle, the longer the segment is, the more likely it is that the inclination angle thereof is used. Thus, even if a moderately oblique segment, which may be an inclination extraction error factor, is present near the center of the image, the extracted segment is short because of an effect of masking. Therefore, a moderately oblique angle, which causes an error, is hardly reflected. Extremely oblique segments are already deleted in the previous processing, so that moderately oblique segments are targeted in this processing.

Then, the inclination correcting means corrects the inclination by rotating the image, based on the obtained inclination angel of the image. In the above inclination correction, when the inclination of the image is large, the edge pixels become unstable, and one segment on the original is divided into a plurality of segments and extracted. Thus, inclination extraction is performed with short segments, so that the correction precision is decreased.

Figure 7:
FIG. 7 is a schematic drawing showing a comic image 9 that has been corrected with respect to the inclination by an image processing apparatus that is an embodiment of the present invention.

In this embodiment, in order to avoid it, it is determined whether or not the absolute value of the extracted inclination angle is not more than a predetermined threshold value by end determining means at the end of the image processing. When it is equal to or less than a threshold value, processing is ended, and when it is larger than the threshold value, inclination extraction is performed again, using the corrected image as an input image, and inclination extraction, inclination correction and end determination are repeated until it is determined that processing has ended. The inclination correction precision can be improved by repeating inclination extraction, inclination correction and end determination in this manner. FIG. 7 is a schematic drawing showing a comic image 9 that has been corrected with respect to the inclination.

Figure 8:
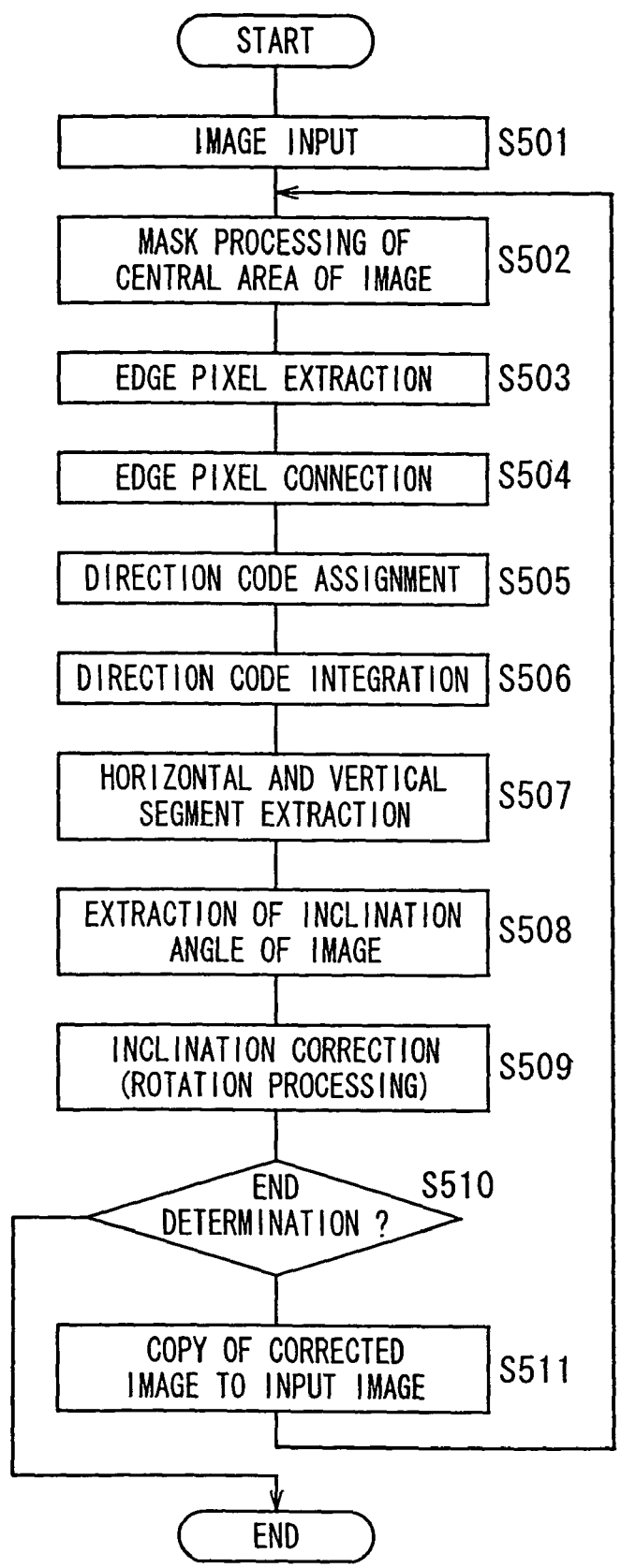
FIG. 8 is a flowchart for explaining an image processing procedure by the image processing apparatus.
Figure 9:
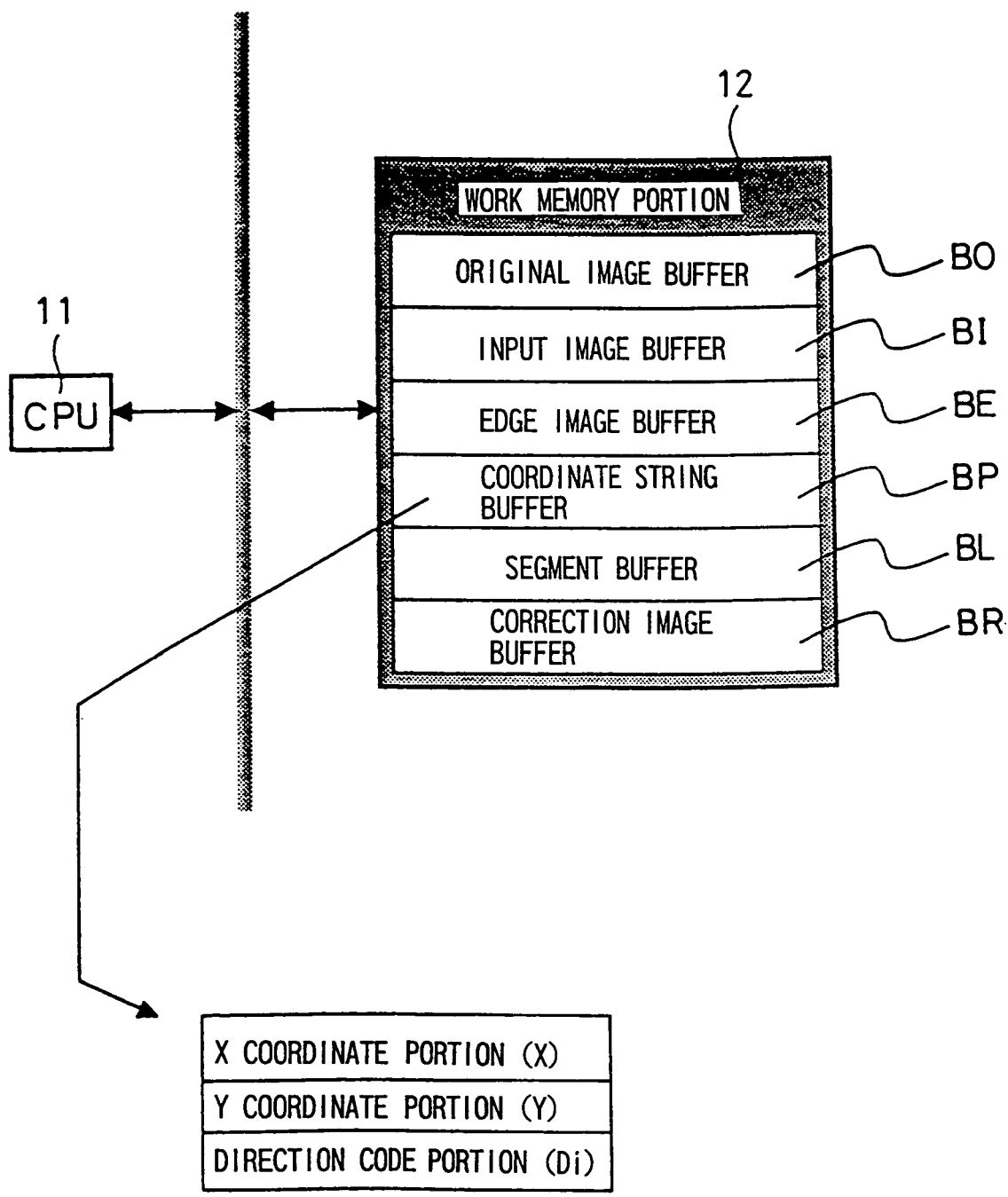
FIG. 9 is a block diagram showing a CPU (central processing unit) 11 and a work memory portion 12 of an image processing apparatus that is an embodiment of the present invention.

FIG. 8 is a flowchart for explaining an image processing procedure by the image processing apparatus. FIG. 9 is a block diagram showing a CPU (central processing unit) 11 and a work memory portion 12 of an image processing apparatus that is an embodiment of the present invention. The work memory portion 12 includes an original image buffer (BO), an input image buffer (BI), an edge image buffer (BE), a coordinate string buffer (BP), a segment buffer (BL) and a correction image buffer (BR), and is controlled by the CPU 11.

First, in step S501, an image input to the image processing apparatus is stored in the original image buffer (BO) and the input image buffer portion (BI).

Then, the pixel values of the central area of the input image buffer (BI) are replaced by the pixel value for the background, which is outside the frame on the original of the image. The shape of the central area can be an arbitrary shape such as a circle or a rectangle. In this embodiment, the shape of the central area is a rectangle, and the length in the longitudinal direction is ⅓ of that of the input image, and the length in the width direction is ⅓ of the input image. Since a monochrome binary image (1 for black image and 0 for white image) is used in this embodiment, the white pixel value 0 is used for the pixel value for the color of the entire central area. The masked image is stored in the input image buffer (BI) as it is (S502).

Then, the input image buffer (BI) is scanned sequentially in two directions, that is, from up to down and from left to right. When the focused pixel is a black pixel (1) and an immediately previous pixel value is a white pixel (0) or an immediately following pixel value is a white pixel (0), then the focused pixel is extracted as an edge pixel and the corresponding pixel value of the edge image buffer (BE) is set to 1. When the above condition is not met, the corresponding pixel value of the edge image buffer (BE) is set to 0, taking the focused pixel as a non-edge pixel, regardless whether it is black or white. As a result of scanning all the pixels of the input image from up to down and from left to right, an edge pixel is stored in the edge image buffer (BE) as a pixel value 1, and a non-edge pixel is stored in the edge image buffer (BE) as a pixel value 0 (S503).

Then, an edge pixel in the edge image buffer (BE) is taken as the focused pixel, and the focused pixel is connected to the first edge pixel in a clockwise rotation of neighboring eight connection pixels. Thus, two-dimensional binary image data (information only of 0 and 1) are converted to a connected edge coordinate string (Xi, Yi). The converted coordinate string is stored in the coordinate string buffer (BP) (S504).

Then, the coordinate string buffer (BP) is scanned, and a code for a direction from the focused coordinate (Xi, Yi) to the next coordinate (Xi+1, Yi+1) is assigned. In this embodiment, 64 direction codes (1, 2, 3, . . . 64) obtained by quantizing the direction with 64 codes in a counterclockwise rotation of 360 degrees are used. Therefore, directions having an angle difference of 360/64=5.6 degrees are set to be given the same direction code. The results thereof are stored in the direction code portion (Di) of the coordinate string buffer (BP) (S505).

Then, the direction code portion (Di) of the coordinate string buffer (BP) is scanned, and the edge coordinate of a point whose direction code has a difference of not more than a predetermined threshold value in the inclination from an adjacent direction code thereof is erased, and the edge coordinate of a point having a difference larger than a predetermined threshold value in the inclination and the edge coordinates of the end points are stored. Furthermore, a new segment connecting a section between the end point and the inflection point is extracted based on the stored edge coordinates, and a new direction code is assigned. As a result, the direction code of the new segment and the coordinates of both the ends of the segment are stored in the segment buffer (BL) (S506).

Then, the segment buffer (BL) is scanned, and the segments that are not segments having a direction code indicating the horizontal direction (direction code 1 and direction code 33) and segment having a direction code indicating the vertical direction (direction code 17 and direction code 49) and have a segment length of not more than a predetermined threshold value are erased. The remaining results are overwritten in the segment buffer (BL) (S507).

Then, the segment buffer (BL) is scanned, and an inclination angle θ of the image is calculated based on the length and the angle of all the extracted horizontal and vertical segments from Formula 1 (S508)

Formula 1

$$\theta = \sum_{i}^{N} \frac{Li}{LT} Ai \quad (1)$$

where N: the number of horizontal and vertical segments,
LT: the total sum of all the segment lengths,
Li: the segment length of the $i^{th}$ segment, and
Ai: the inclination angle of the $i^{th}$ segment.

Then, the input image buffer (BI) is rotated based on the inclination angle θ of the extracted image so as to correct the inclination. The corrected image is stored in the corrected image buffer (BR) (S509).

Then, it is determined whether or not the absolute value of the extracted inclination angle θ of the image is equal to or less than a predetermined threshold value. When it is equal to or less than a predetermined threshold value, the processing is ended (S510). When the inclination angle θ of the image is larger than the predetermined threshold value, the content of the corrected image buffer (BR) is copied to the input image buffer (BI) (S511), and the procedure goes back to S502 for performing inclination extraction and inclination correction again. Thereafter, steps S502 to S511 are repeated until it is determined that processing has ended at the end determination at S510, so that the inclination of the image is corrected with high precision.

The image processing method can be recorded in a computer-readable record medium as a program to be executed on a computer such as an image processing apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the present invention, the image processing apparatus can perform inclination correction with high precision, even if a segment present in an image is in contact with a character or a picture, an oblique segment, which is a factor of a correction error, is present, or a peripheral edge of an original is not white. Therefore, inclination correction of, for example, comic images can be performed in a high speed and high precision.

The invention claimed is:

1. An image processing apparatus for correcting an inclination of an input image, comprising:
    edge extracting means for extracting edge pixels of an input image;
    segment extracting means for extracting a segment by connecting the edge pixels extracted by the edge extracting means;
    inclination extracting means for extracting an inclination angle of the image based on the segment extracted by the segment extracting means; and
    inclination correcting means for correcting an inclination of the image based on the inclination angle of the image extracted by the inclination extracting means,
    wherein the edge extracting means sets pixel values in a central area of the input image to one and the same predetermined pixel value.

2. The image processing apparatus of claim 1, wherein the edge extracting means extracts edge pixels of an image having the pixel values in the central area set to one and the same predetermined pixel value.

3. An image processing apparatus for correcting an inclination of an input image, comprising:
    edge extracting means for extracting edge pixels of an input image;
    segment extracting means for extracting a segment by connecting the edge pixels extracted by the edge extracting means;
    inclination extracting means for extracting an inclination angle of the image based on the segment extracted by the segment extracting means; and
    inclination correcting means for correcting an inclination of the image based on the inclination angle of the image extracted by the inclination extracting means,
    wherein the segment extracting means includes:
    means for connecting edge pixels so as to extract edge coordinates;
    direction code assigning means for scanning the edge coordinates so as to assign a code for a direction from each edge coordinate to the next edge coordinate; and
    second direction code assigning means for assigning a new direction code to a new segment by connecting an edge coordinate based on a difference in the inclination between a direction code and an adjacent direction code thereof and an edge coordinate of the end point.

4. The image processing apparatus of claim 3, wherein the second direction code assigning means scans the direction code of each edge coordinate, erases an edge coordinate of a point whose direction code has a difference of not more than a predetermined threshold value in the inclination from an adjacent direction code thereof, stores an edge coordinate of an inflection point that has a difference larger than a predetermined threshold value in the inclination and stores an edge coordinate of the end point, extracting a new segment by connecting each point, and assigns a new direction code to the new segment.

5. The image processing apparatus of claim 3, wherein the segment extracting means scans the segments to which the new direction code is assigned, and extracts a segment whose segment length is longer than a predetermined threshold value and whose inclination in the direction code is in a predetermined range as a horizontal segment or a vertical segment.

6. An image processing apparatus for correcting an inclination of an input image, comprising:
    edge extracting means for extracting edge pixels of an input image;
    segment extracting means for extracting a segment by connecting the edge pixels extracted by the edge extracting means;
    inclination extracting means for extracting an inclination angle of the image based on the segment extracted by the segment extracting means; and inclination correcting means for correcting an inclination of the image based on the inclination angle of the image extracted by the inclination extracting means, wherein the inclination extracting means extracts an angle of each segment with respect to all the extracted segments, multiplies the extracted angle of each segment by a weight obtained by taking the sum of the length of all the segments as a denominator and the length of each segment as a numerator, and extracts a value obtained by adding all the segment angles with the weight as an inclination angle of the image.

7. The image processing apparatus of claim 1, further comprising:

end determining means for determining that correction has ended when the inclination corrected by the inclination correcting means is equal to or less than a predetermined threshold value, wherein inclination extraction, inclination correction and end determination are repeated using an output image obtained after the inclination correction as a new input image until the end determining means determines that correction has ended.

8. An image processing method for correcting an inclination of an input image comprising:

extracting edge pixels of an input image;

connecting the extracted edge pixels so as to extract a segment;

extracting an inclination angle of the image based on the extracted segment; and correcting an inclination of the image based on the extracted inclination angle of the image, wherein the step of extracting edge pixels includes a step of setting each pixel value in a central area of the input image to the same predetermined pixel value.

9. The image processing method according to claim 8, further comprising the step of:

determining that correction has ended when the corrected inclination is equal to or less than a predetermined threshold value, wherein when the corrected inclination is larger than a predetermined threshold value, inclination extraction, inclination correction and end determination are repeated using an output image obtained after the inclination correction as a new input image, until it is determined that correction has ended.

10. A computer-readable record medium storing a program for letting a computer execute an image processing method comprising the steps of:

extracting edge pixels of an input image;

connecting the extracted edge pixels so as to extract a segment;

extracting an inclination angle of the image based on the extracted segment; and correcting an inclination of the image based on the extracted inclination angle of the image, wherein the step of extracting edge pixels includes a step of setting each pixel value in a central area of the input image to the same predetermined pixel value.

11. The computer-readable record medium according to claim 10, the image processing method further comprising the step of:

determining that correction has ended when the corrected inclination is equal to or less than a predetermined threshold value, wherein when the corrected inclination is larger than a predetermined threshold value, inclination extraction, inclination correction and end determination are repeated using an output image obtained after the inclination correction as a new input image, until it is determined that correction has ended.

* * * * *